May 14, 1957     W. R. WICKERHAM     2,792,543

SYNCHRO-TIE LAG COMPENSATOR

Filed Jan. 6, 1954

WITNESSES:
Edwin E. Bassler
Leon M. Garman

INVENTOR
William R. Wickerham
BY
Paul E. Friedemann
ATTORNEY

United States Patent Office
2,792,543
Patented May 14, 1957

2,792,543

SYNCHRO-TIE LAG COMPENSATOR

William R. Wickerham, Buffalo, N. Y., assignor to Westinghouse Electric Corporation, East Pittsburgh, Pa., a corporation of Pennsylvania Application January 6, 1954, Serial No. 402,484

8 Claims. (Cl. 318—44)

My invention relates to electric control apparatus, and more particularly to control apparatus for alternating current dynamoelectric machines for effecting synchronous operation of such machines.

One broad object of my invention is the transmission of angular movement of a rotor of a transmitting dynamoelectric machine at one location to the rotor of a receiving dynamoelectric machine at another location including means for changing the relative position of the rotor of the receiving dynamoelectric machine and transmitting dynamoelectric machine while the rotors remain synchronously interlocked.

A more specific object of my invention is the provision of a system for the transmission of angular movement employing alternating current, in which the transmitting and receiving dynamoelectric machines are each provided with primary windings connected through phase shifting circuitry to the same source of single phase alternating current, and the dynamoelectric machines are each provided with polyphase secondary windings, the secondary windings being interconnected. A system of this type is self-synchronizing.

One of the outstanding features of my contribution to a self-synchronizing system of this type is the provision of very simple and effective phase shifting means for the primary windings of the dynamoelectric machines to effect angular displacement of one rotor with respect to the other rotor while the rotors remain locked in synchronism.

The objects stated are merely illustrative. Other objects and advantages will become more apparent from a study of the following specification and the accompanying drawing, in which.

In all the figures, L1 and L2 represent the two leads of a source of single phase alternating current. In Figs. 1a, 1b, 1c, and 2, the dynamoelectric machine shown constitutes an alternating current motor having a three-phase primary, or stator, winding and having a three-phase secondary, or rotor, winding.

Figure 1A:
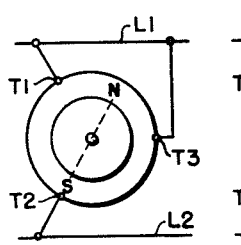
Figures 1a, 1b and 1c illustrate three different rotor positions of an alternating current dynamoelectric machine connected in three different arrangements to a single phase source of alternating current.
Figure 1B:
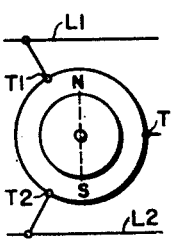
Figure 1C:
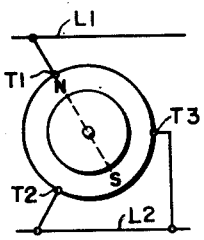

If the motor terminals T1 and T2 are connected to leads L1 and L2 and T3 is connected to L1, then the stator magnetic pole will be as indicated by N–S in Fig. 1a. When the terminal T3 is disconnected, the stator magnetic pole will shift 30 electrical degrees in a counterclockwise direction, as indicated by N–S in Fig. 1b. When terminal T3 is connected to lead L2, the stator magnetic pole shifts an additional 30 electrical degrees in the counterclockwise direction.

To effect such pole shift of 60 electrical degrees in a counterclockwise direction, gradually I connect a dividing impedance, or an autotransformer AT directly across leads L1 and L2. (See Fig. 2.) By connecting the terminal T3 to a flexible lead provided with a tap T for connection to any point on the autotransformer from a point at the upper connection, or lead L1, to a point on the lower connection, or lead L2, the pole may be shifted gradually, as indicated in Fig. 2.

The characteristics of the pole shifting illustrated by Figs. 1a, 1b, 1c and Fig. 2 may be very effectively used in a complete control for moving a load at a remote point not only in synchronism with the movement of a transmitter, but in such a manner as to compensate for phase lag because of the load on the receiver.

Figure 2:
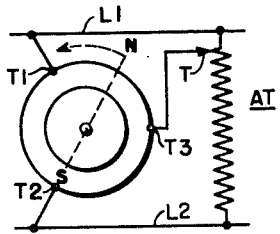
Fig. 2 illustrates a circuit arrangement for gradually changing the phase of the supply to a dynamoelectric machine.
Figure 3:
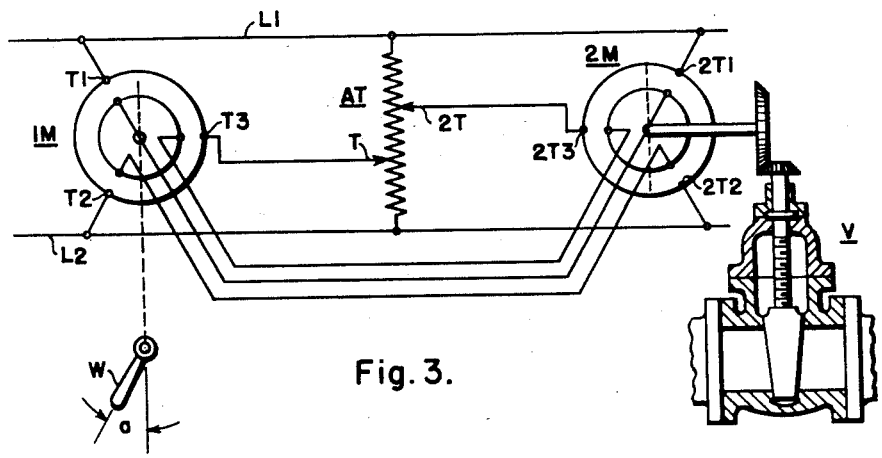
Fig. 3 illustrates a complete system of control for operating a load from a remote point.

For example, in Fig. 3 the motor 1M is shown connected electrically in the manner of the showing in Fig. 2, and the motor 2M is similarly connected to the supply and the autotransformer AT. The taps T and 2T provide the required pole shift in the two machines.

The rotor of motor 1M is coupled to an actuating lever, or wheel W, and the rotor of the motor 2M is coupled to the valve mechanism V, or some other suitable load. In the absence of the compensating feature shown in Fig. 3, the control handle W, to move the load a given amount, must first be moved through the angle a to build up the necessary torque. By adjusting the taps T and 2T properly, movement of the load may be caused to move ahead, in position, or in lagging relation to the movement of lever W. I thus provide a very effective way of compensating for the positional lag the load torque produces.

Figure 4:
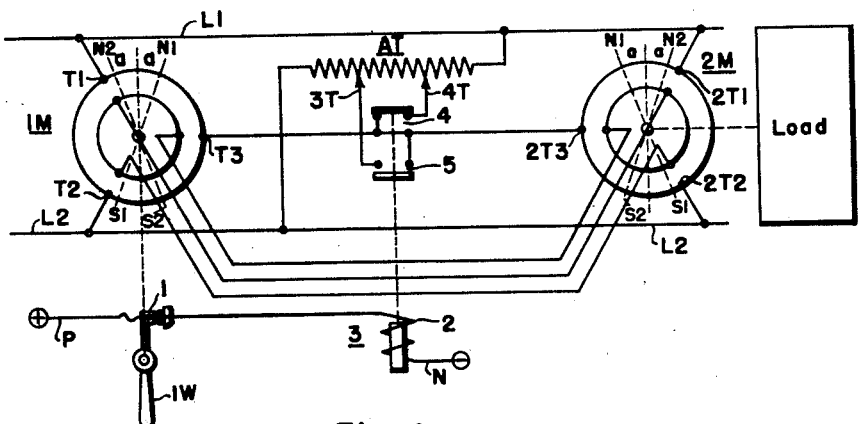
Fig. 4 illustrates a modified complete system of control for effecting the operation of a load in a predetermined manner from a remote position.

In the compensating control system shown in Fig. 4, a slight clockwise movement of the lever 1W establishes a circuit from the positive conductor P through contacts 1, actuating coil 2 of the control relay 3 to the negative conductor N. The control relay thus operates to open contacts 4 and to close contacts 5. This connection of the terminals T3 and 2T3 to the transformer AT through tap 3T and contacts 5 shifts the magnetic pole of the transmitter machine 1M substantially to N2—S2 and the magnetic pole of the receiver machine 2M substantially to N2—S2, such that the angle between the pole center lines equals the angle a, and the necessary torque appears at once. The design of contacts 1 is such that further clockwise movement of lever 1W merely maintains these contacts closed by friction developed between the handle shaft and the contact moving elements.

A slight movement of the handle in a counterclockwise direction opens contacts 1. This deenergizes the control relay to thus close contacts 4 and open contacts 5. This operation shifts the magnetic pole of the transmitter substantially to N1—S1, and the magnetic pole of the receiver substantially to N1—S1 to compensate for the opposite direction of movement.

While I have shown but one embodiment of my invention and one modification, other variations of my invention may be devised, all falling within the spirit of my invention.

I claim as my invention:

1. In an electric system for the transmission of angular motion, in combination, a pair of leads comprising a first lead and a second lead energized with single phase alternating current, an alternating current motor having three-phase primary, or stator, windings, and having three-phase secondary, or rotor, windings, circuit means for connecting the first and second motor primary terminals across said leads and for connecting the third motor primary terminal to the first lead, a second similar alternating current motor having its rotor coupled to a load, the first and second primary terminals of said second motor being connected across said leads and the third motor primary terminal being connected to the second lead, corresponding secondary motor terminals of said two motors being connected to each other, and means for angularly moving the rotor of the first motor.

2. In an electric system of control, the combination of an alternating current motor having three-phase primary windings and three-phase secondary windings, a second similar motor, said two motors having corresponding motor secondary terminals connected to each other, a first lead, a second lead, a voltage dividing impedance connected across said leads, circuit means for connecting two corresponding primary terminals of said motors across said leads, circuit means for connecting the third primary terminal of the first motor to a selected point on the voltage dividing impedance, circuit means for connecting the third primary terminal of the second motor to a selected point on the voltage dividing impedance, said leads being energized with single phase alternating current.

3. In an electric system of control, the combination of an alternating current motor having three-phase primary windings and three-phase secondary windings, a second similar, or rotor, motor, said two motors having corresponding motor secondary terminals connected to each other, a first lead, a second lead, a voltage dividing impedance connected across said leads, circuit means for connecting two corresponding primary terminals of said motors across said leads, circuit means for connecting third primary terminal of the first motor to a selected point on the voltage dividing impedance, circuit means for connecting the third primary terminal of the second motor to a selected point on the voltage dividing impedance, said leads being energized with single phase alternating current, control means for angularly moving the rotor of the first motor, and means responsive to the operation of said control means for changing the position of the point of connection of at least one of the third primary motor terminals to said voltage dividing impedance.

4. In an electric system of control, the subcombination of, a pair of terminals energized with single phase alternating current, an alternating current motor having three-phase primary windings, a voltage dividing impedance connected across said terminals, a pair of motor primary terminals connected across said terminals, and circuit means for connecting the third motor primary terminal to any selected point on said voltage dividing impedance.

5. In an electric system of control, the subcombination of, a pair of terminals energized with single phase alternating current, an alternating current motor having three-phase primary windings, a voltage dividing impedance connected across said terminals, a pair of motor primary terminals connected across said leads, said motor having a rotor, control means for angularly moving said rotor, and circuit means including switching means responsive to the angular movement of the rotor of said motor for connecting the third motor primary terminal to any selected point on said voltage dividing impedance.

6. In an electric system of control, in combination, a pair of supply terminals in use energized with single phase alternating current, a reactor winding, having a plurality of taps, connected across said terminals, an alternating current motor having a three-phase primary winding, circuit means for connecting two of the primary terminals of the motor primary winding across said supply terminals and for connecting the third primary terminal selectively to any one of the taps on the reactor winding, a second motor similar to the first having corresponding primary terminals connected to corresponding supply terminals and having its third primary terminal connected selectively to any one of the taps on the reactor winding, and circuit means for interconnecting the secondary windings of said motors.

7. In an electric system of control in combination, a pair of supply terminals in use energized with single phase alternating current, an autotransformer, having a plurality of taps, connected across said terminals, an alternating current motor having a three-phase primary winding, circuit means for connecting two of the primary terminals of the motor primary winding across said supply terminals and for connecting the third primary terminal selectively to any one of the taps on the autotransformer, a second motor similar to the first having corresponding primary terminals connected to corresponding supply terminals and having its third primary terminal connected selectively to any one of the taps on the autotransformer, and circuit means for interconnecting corresponding terminals of the motor secondary windings to each other.

8. In an electric system of control, the sub combination, an impedance, having a plurality of taps therealong, energized with single phase alternating current, an alternating current dynamoelectric machine having a three-phase primary winding and a three-phase wound rotor secondary winding, circuit means for energizing two terminals of the primary windings with the same single phase alternating current supplied to the impedance, and circuit means for connecting the third primary terminal selectively to any one of the taps on said impedance.

References Cited in the file of this patent
UNITED STATES PATENTS 2,492,734    Choudhury            Dec. 27, 1949